Dec. 8, 1936. A. WILHELMI 2,063,775
APPARATUS FOR INDICATING AND RECORDING THE
DUST CONTENT OF BLAST FURNACE GASES
Filed Nov. 28, 1934 3 Sheets-Sheet 1

Inventor
A. Wilhelmi
by
W. E. Evans,
Attorney.

Dec. 8, 1936.  A. WILHELMI  2,063,775
APPARATUS FOR INDICATING AND RECORDING THE
DUST CONTENT OF BLAST FURNACE GASES
Filed Nov. 28, 1934  3 Sheets-Sheet 3

Inventor
A. Wilhelmi
by
W. E. Evans
Attorney.

Patented Dec. 8, 1936

2,063,775

UNITED STATES PATENT OFFICE 2,063,775

APPARATUS FOR INDICATING AND RECORDING THE DUST CONTENT OF BLAST FURNACE GASES

Alfred Wilhelmi, Oberhausen, Rhineland, Germany, assignor to H. A. Brassert & Company Limited, London, England Application November 28, 1934, Serial No. 755,165
In Germany August 19, 1933

5 Claims. (Cl. 73—51)

This invention relates to apparatus for indicating and recording the dust content of blast furnace gases.

As is well known, the dust produced depends upon a number of factors such as the amount of dust in the burden, the character of the materials charged, the temperature and velocity of the gases leaving the furnace, the method of dumping of the burden and the height through which the burden falls, that is to say, the depth of the free space between the stock line and the bell. Even with the same height of fall, the same dust content of the burden and the same operating velocities, the amount of flue dust produced may vary considerably, and despite a burden free from fine particles, the quantity of fine dust produced may be unreasonably large. This irregular state of affairs may be due to uneven furnace driving. Pieces of ore when heated to a high degree become friable and rub against each other excessively and produce abnormal quantities of dust. Further with uneven distribution of the gases, that is to say with channeling, more dust may be carried through the burden. Such conditions lead to a variable product and unfavourable operating results.

The usual daily weighing of the flue dust made only gives a summary of the dust produced over the daily period, while photographic methods or tests by aspiration from the gas flue give spot tests after the dust-catcher only. It is desirable, therefore, to be able to determine at any instant, both quantitatively and qualitatively, the production of dust, so that it may be possible to detect irregular working and to take the necessary steps to counteract it immediately.

The present invention has for its object to fulfil these requirements by providing for the continuous indication and/or recording of the quantity of dust contained in the gases passing through the offtakes.

According to the invention a proportion of the gas passing through the gas offtake of the furnace is by-passed and the dust present in the volume of gas thus withdrawn from the main flow or a proportion of the dust present is weighed or otherwise measured continuously or intermittently so that the quantity of dust present at any moment may be determined.

According to the invention, moreover, the measurement of the dust is advantageously effected by causing the dust-bearing gas to traverse apparatus whereby the dust is separated from the gas and is collected for measurement, the measurement being advantageously effected by mechanism permitting of continuous operation.

According to the invention, moreover, the measuring apparatus may comprise a weigh beam provided with a receptacle or receptacles for the reception of the dust, and the gas withdrawn from the offtake may be projected in the direction of the receptacle or receptacles for the purpose of the deposition of the dust in the latter in such manner that when the receptacle has received a determined quantity of dust the beam is tipped and the receptacle emptied or a second receptacle brought into position to receive the dust.

According to the invention, moreover, it is advantageous to withdraw the gas from the offtake at a position of mean velocity whereby a measurement of the mean content of dust may be secured.

According to the invention, also, in order that a record of the operation of the furnace may be secured the apparatus effecting the measurement of the dust may be adapted to operate the style of a recording apparatus or alternatively to control at a distance the operation of a recording mechanism actuated electrically or by any other known devices.

Thus, where the apparatus is provided as a weigh beam the gradual filling of the receptacle may be caused to effect a gradual tilting of the beam until the receptacle is full, and such gradual movement of the beam may be recorded upon a record surface moving forward with a uniform speed. On the discharge of the receptacle and the recovery of the weigh beam to its initial position, the style of the recording mechanism may be returned to the zero point. From the form of the line thus traced by the style upon the record surface the relative rate of production of dust in the furnace may be noted and thus there may be determined any disturbance of working or change in the operation of the furnace.

The invention is illustrated by way of example, in the accompanying drawings.

Figures 1, 2:
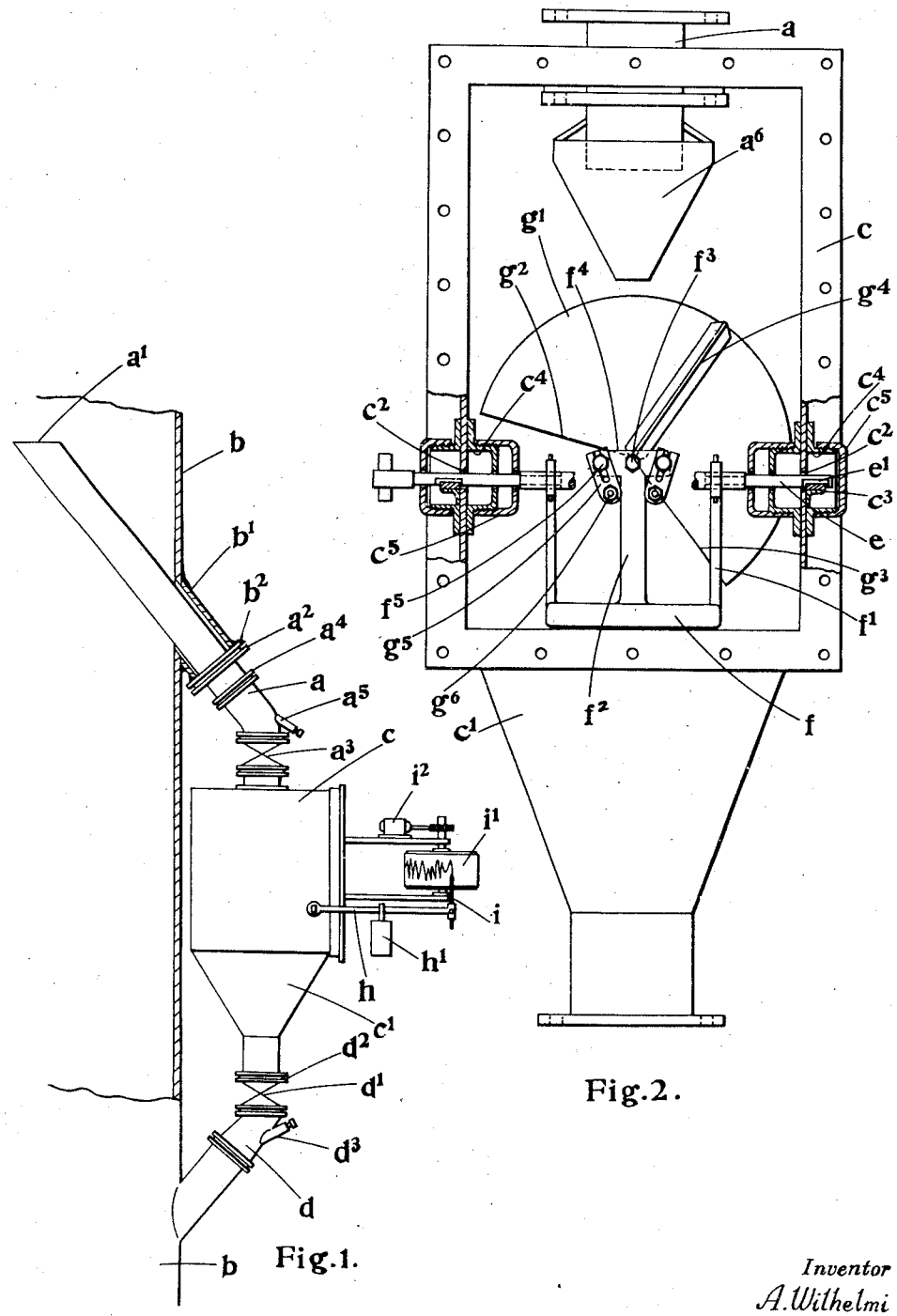
Figure 1 is a side elevation of an apparatus according to the invention, as applied to a blast furnace gas off-take pipe, shown in section, and provided with a style-recording mechanism.
Figure 2 is a sectional elevation, to an enlarged scale, of the apparatus according to the invention.

In carrying the invention into effect as illustrated in Figure 1, a by-pass dust recovery tube $a$ is provided to extend into the gas off-take pipe $b$ at a position where the flow of the gas is in a downward direction and is suitably inclined to the axis of the pipe, the inlet opening of the tube being disposed at a position at which the gas is flowing in the gas off-take pipe with mean velocity, that is to say, the tube may extend inwardly to one third of the diameter of the pipe. The tube $a$ conveniently enters the pipe $b$ by way of the sleeve or socket $b^1$ through which it extends and to which it is secured by means of juxtaposed flanges $a^2$, $b^2$. At the lower end it is connected to the advantageously rectangular casing $c$ formed with the lower part $c^1$ of hopper-like shape. The casing $c$ is in turn connected to the gas off-take pipe $b$ by a tube $d$. By such means a proportional volume of the gas flowing through the off-take pipe $b$, together with the suspended dust, is diverted from the main flow into the casing $c$ for the measurement of the content of dust and is then returned into the off-take pipe. The tube $a$ is provided with a slide or like valve $a^3$ and the tube $d$ with a similar valve $d^1$. The casing $c$ can thus be isolated from the off-take pipe when necessary. Should the valves fail to operate, sheet metal slides may be introduced between the flanges $a^4$ or $d^2$. In order to permit of the clearance of dust which may become lodged in the tubes $a$ and $d$ there are provided tubular clearing fittings $a^5$, $d^3$, closed by removable plugs, through which may be inserted wire or a rod or clearing devices.

The casing $c$ serves to receive a weighing apparatus comprising a double receptacle which is pivotally mounted upon a weigh beam in such manner that it is unstable and tends always to rock to bring one compartment of the receptacle into a position immediately above the pivotal axis.

The tube $a$ is extended into the casing $c$ and is provided with a nozzle $a^6$ of a hopper-like shape in cross-section, which nozzle is disposed with its mouth closely positioned above the pivotal axis of the receptacle so that the gas together with the suspended dust passing into the casing $c$ from the gas off-take pipe is directed into the compartment of the receptacle which is at the moment in the uppermost position. When one compartment of the receptacle is sufficiently filled with dust the receptacle is tipped for the discharge of the said compartment and the second compartment is then brought into the filling position.

In the construction represented in the drawings opposite walls of the casing are provided with openings $c^2$ through which the pivot spindle $e$ of the weigh beam may extend. On the outer wall of the casing adjacent the said openings there are mounted brackets $c^3$ supporting hardened bearing surfaces adapted to receive knife edges $e^1$ respectively formed adjacent the ends of the pivot spindle. In order that the spindle may maintain approximately its concentricity with the openings $c^2$ in the wall of the casing, the knife edges are cut back into the spindle to the axis or the brackets $c^3$ are so formed to position the knife edges away from the walls of the casing that the ends of the spindle $e$ passing through the walls of the casing may be bent or diverted so that their axes are in alignment with or coincide with the line of the knife edges. Concentric with the openings $c^2$ in the walls of the casing there are mounted, on the inner and outer faces of the walls, annular or cup-like fittings $c^4$ provided with flanges by which they may be secured to the walls of the casing. The exterior peripheries of the said fittings are screw-threaded for the reception of cover caps $c^5$. The said fittings and the caps serve to confine a suitable packing, for example, of asbestos, wool and grease. The pivot spindle $e$ is provided to support within the casing $c$ one part of the weigh beam comprising a rectangular framing $f$ which is suspended from the pivot spindle by two upwardly inclined arms $f^1$ having bearing sleeves by which they may be mounted in position upon the said pivot spindle. At oppositely disposed positions the rectangular frame $f$ is provided with upwardly extending arms $f^2$ which serve for the support of the pivot spindle $g$ of the dust receptacle which is formed by two segmental plates $g^1$ suitably disposed apart and separated by three radial walls $g^2$, $g^3$, $g^4$ respectively forming the bottom plates of the two compartments of the receptacle and the dividing wall between the compartments. The pivot spindle is advantageously provided to be supported upon two pivot pins $f^3$ carried by the arms $f^2$ of the frame $f$.

By reason of the disposition of the pivot spindle $g$ of the receptacle with reference to the body of the receptacle, as hereinbefore stated the receptacle is of unstable equilibrium and tends always to swing downwardly to one side or the other of the pivot pin. For the determination of the extent to which such movement may take place the upstanding arms $f^2$ of the frame $f$ are provided at their upper ends with transverse bars $f^4$ through which the pivot pins $f^3$ pass and which serve to receive adjusting bolts $f^5$ by which the relative position of fittings $g^5$ of fork-like shape may be determined. Such fittings serve to support transverse bars $g^6$ which act as stops for the respective compartments of the receptacle. It will be noted that the bars $g^6$ may be adjusted in position either by longitudinal movement of the forked fittings $g^5$ or by rotation of the forked fittings about the axes of the adjusting bolts $f^5$.

At the exterior of the casing $c$ the pivot spindle $e$ of the weigh beam is provided to receive the second part of the weigh beam in the form of an arm $h$ upon which may be secured in an adjusted position a counterweight $h^1$.

The casing $c$ is conveniently provided with one wall formed as a removable cover plate $c^6$ so that the mechanism may be readily inspected or repaired.

It will be observed that in the operation of the apparatus the gas diverted from the gas off-take pipe $b$ passes through the casing $c$ and returns to the gas off-take pipe, but by reason of the disposition of the nozzle $a^6$ the dust suspended in the gas is wholly or almost wholly deposited in the compartments of the receptacle. Thus, one of the compartments being in the uppermost position the dust accumulates therein to the extent to cause the weigh beam to turn about its pivot spindle e gradually as the weight increases. At a particular moment the weight of dust within the compartment over-balances the receptacle, which rotates about its pivot spindle g for the discharge of the dust in the one compartment, which dust returns through the bottom of the casing and the tube d to the offtake pipe.

The movement of the weigh beam hereinbefore described may be applied in various ways for the purpose of indicating or recording the content of dust present in the gas at any moment. Thus, as illustrated in Figure 1, the arm h of the weigh beam may be provided to operate a style i which is caused to travel over a record surface $i^1$ in the form, for example, of a reel of paper carried by a drum which is rotated in any suitable manner as by an electric or other motor $i^2$ or through any suitable drive. It is advantageous in such a construction that the style should be guided in a guide or slideway extending parallel with the axis of rotation of the drum.

Figure 4:
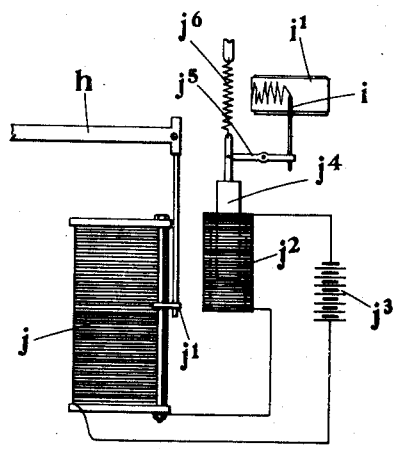
Figure 4 is a detail view in illustration of a style-recording mechanism disposed at a distance from the apparatus and operated electrically.

Such a recording mechanism may if desired, be operated at a distance through a pneumatic or electric transmission. Thus, for example, as illustrated in Figure 4, the arm h of the weigh beam may serve to vary the position of the contact $j^1$ or contact arm of a resistance j included in the circuit of a solenoid or magnet coil $j^2$ and a battery $j^3$ or other source of current and the solenoid or magnet core $j^4$ may be connected to a lever $j^5$ operating the style i, the force exerted by the core being opposed by a spring $j^6$ so that in the normal position of the weigh beam the style i occupies the zero position upon the record surface $i^1$.

Figure 5:
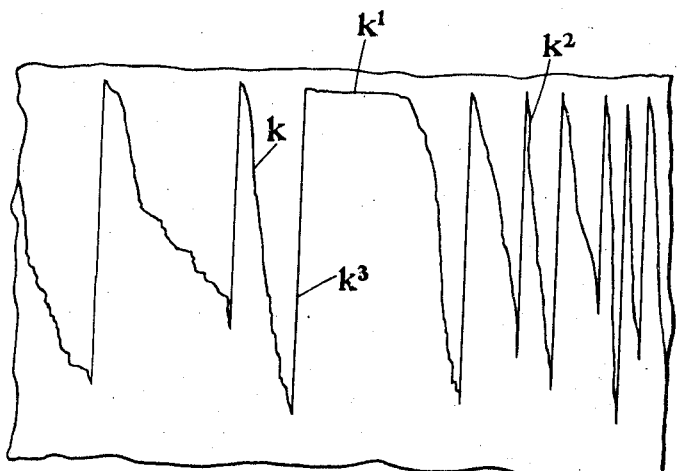
Figure 5 is a diagram representing a position of a chart or record as produced by means of a style-recording mechanism.

With the apparatus as described, the style will produce a record such as is represented in Figure 5. Thus, assuming that the record drum rotates about a vertical axis, uniform dust production in the furnace results in a uniform addition to the weight of dust added to the receptacle from the nozzle $a^6$ and is represented on the chart or record by a straight inclined or broken line k, the angle of incline indicating the degree of dust production. When the furnace is not operating or where there is bad scaffolding with little or no gas passing through the burden within the furnace, a horizontal or substantially horizontal line $k^1$ is produced on the record. When a charge is being dumped into the furnace a sifting of the dust occurs and the increase of the volume of dust carried away is represented in the record by a steeper inclination of the line, as at $k^2$, traced by the style.

Normal furnace operation is indicated by a record having a quite definite saw tooth appearance. When the full tipping compartment is emptied, a substantially vertical line $k^3$ is produced by the return movement of the weigh beam. The distance apart of such vertical lines gives an indication of the rate of production of dust for a given operating velocity of the furnace.

Figure 3:
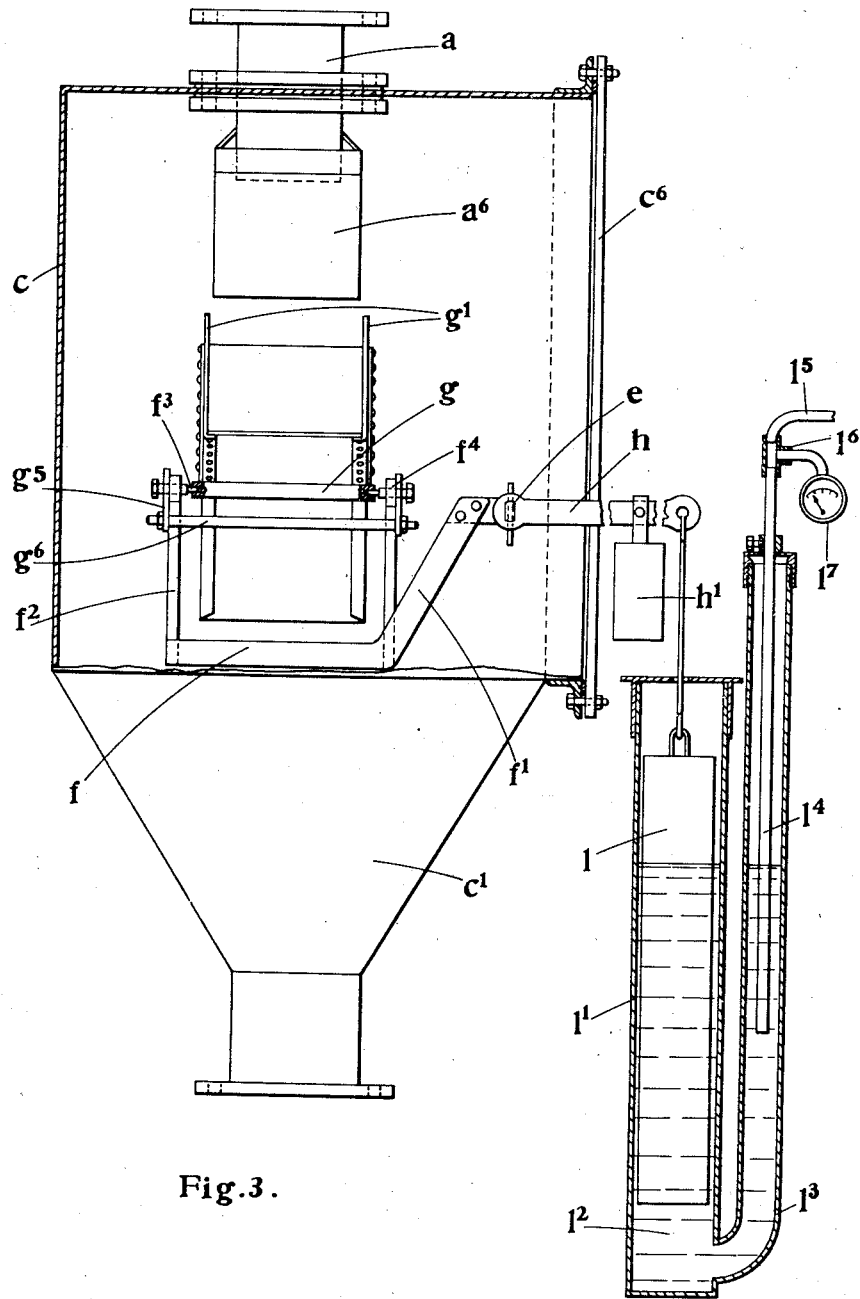
Figure 3 is a side elevation of the apparatus according to the invention, the side wall of the casing being omitted. The figure also illustrates in sectional elevation a form of pressure-actuated indicating mechanism.

As illustrated in Figure 3, the movement of the weigh beam is indicated pneumatically upon a gauge. In the particular construction represented, the weigh beam supports a cylindrical body l fitting loosely within a cylindrical casing $l^1$ charged with liquid $l^2$ to a particular level, the body being normally maintained partly above the surface level of the liquid. The cylindrical casing is connected at the lower end to a second cylindrical casing or tube $l^3$ of greater length but smaller diameter into which extends from the upper end a tube $l^4$ the lower end of which is immersed to a determined depth in the liquid $l^2$ within the tube $l^3$ which stands under normal conditions at the same level as in the cylindrical casing $l^1$. The tube $l^4$ is connected at the upper end to a supply pipe $l^5$ by which air under pressure may be caused to pass through the tube $l^4$. It is also connected to a second tube $l^6$ which communicates with the indicating gauge $l^7$. In the operation of such mechanism when the weigh beam moves under the weight of the dust the cylindrical body l is withdrawn from the liquid $l^2$ to an extent to cause the level to fall both in the cylindrical casing $l^1$ and in the connected tube $l^4$ in such manner that the air under pressure within the centrally disposed tube may escape and indicate the determined pressure upon the gauge $l^7$.

It will be understood from the description of different constructions of apparatus hereinbefore contained that the invention is not limited to any particular type of apparatus by which the measurement or recording is effected, and that the apparatus may be adapted according to the particular applications for which it is required.

I claim:

1. The combination with the gas off-take of a blast furnace, of means for determining the dust content of dust laden gases passing downwardly through said off-take, comprising a casing, a gas and dust inlet pipe leading from the interior of said gas off-take remote from the wall thereof and from a point above the said casing and downwardly therefrom into the upper portion of said casing, a gas and dust discharge pipe leading from the bottom portion of said casing downwardly therefrom and into the said off-take, said casing, inlet pipe and discharge pipe constituting a by-pass for the continuous flow of gas and dust from and back to the off-take, dust collecting means and means for mounting it for vertical movement within said casing under the weight of dust accumulating in said means and for also mounting it for automatically discharging a predetermined quantity of accumulated dust therefrom into the casing, means for automatically returning the empty dust collecting means to its initial position after discharging, and means actuated by and during the downward travel of the dust collecting means for indicating the character of the downward travel thereof.

2. The combination with the gas off-take of a blast furnace, of means for determining the dust content of dust laden gases passing downwardly through said off-take, comprising a casing, a gas and dust inlet pipe leading from the interior of said gas off-take remote from the wall thereof and from a point above the said casing and downwardly therefrom into the upper portion of said casing, a gas and dust discharge pipe leading from the bottom portion of said casing downwardly therefrom and into the said off-take, said casing, inlet pipe and discharge pipe constituting a by-pass for the continuous flow of gas and dust from and back to the off-take, dust collecting means and means for mounting it for vertical movement within said casing under the weight of dust accumulating in said means and for also mounting it for automatically discharging a predetermined quantity of accumulated dust therefrom into the casing, means for automatically returning the empty dust collecting means to its initial position after discharging, and means actuated by and during the downward travel of the dust collecting means for indicating the time consumed in collecting the predetermined quantity of dust required for discharging the receptacle.

3. The combination with the gas off-take of a blast furnace, of means for determining the dust content of dust laden gases passing downwardly through said off-take, comprising a casing, a gas and dust inlet pipe leading from the interior of said gas off-take remote from the wall thereof and from a point above the said casing and downwardly therefrom into the upper portion of said casing, a gas and dust discharge pipe leading from the bottom portion of said casing downwardly therefrom and into the said off-take, said casing, inlet pipe and discharge pipe constituting a by-pass for the continuous flow of gas and dust from and back to the off-take, dust collecting means and means for mounting it for vertical movement within said casing under the weight of dust accumulating in said means and for also mounting it for automatically discharging a predetermined quantity of accumulated dust therefrom into the casing, means for automatically returning the empty dust collecting means to its initial position after discharging, and means actuated by and during the downward travel of the dust collecting means for indicating the relative times consumed in successive collections of said predetermined quantity of dust in the dust collecting receptacle.

4. The combination with the gas off-take of a blast furnace, of means for determining the dust content of dust laden gases passing downwardly through said off-take, comprising a casing, a gas and dust inlet pipe leading from the interior of said gas off-take remote from the wall thereof and from a point above the said casing and downwardly therefrom into the upper portion of said casing, a gas and dust discharge pipe leading from the bottom portion of said casing downwardly therefrom and into the said off-take, said casing, inlet pipe and discharge pipe constituting a by-pass for the continuous flow of gas and dust from and back to the off-take, a dust collecting receptacle mounted within the casing, a counter-balance supporting the dust collecting receptacle and adapted to be progressively overbalanced by accumulations of dust in said dust collecting receptacle, said dust collecting receptacle being mounted in pivotal unstable condition on the counter-balance to automatically tilt thereon and dump accumulated dust at a predetermined weight thereof, and means connected with the counter-balance and actuated thereby during movement thereof for indicating the character of the downward travel of the receptacle.

5. The combination with the gas off-take of a blast furnace, of means for determining the dust content of dust laden gases passing downwardly through said off-take, comprising a casing, a gas and dust inlet pipe leading from the interior of said gas off-take remote from the wall thereof and from a point above the said casing and downwardly therefrom into the upper portion of said casing, a gas and dust discharge pipe leading from the bottom portion of said casing downwardly therefrom and into the said off-take, said casing, inlet pipe and discharge pipe constituting a by-pass for the continuous flow of gas and dust from and back to the off-take, a rock shaft mounted within the casing, a frame carried by and projecting at one side of the rock shaft, means for counter-balancing the rock shaft and the frame, a two compartment open top bucket pivotally mounted upon the frame in unstable condition such that the open top of one or the other of the compartments is always below and in register with the lower end of the dust inlet pipe, and means actuated by the counter-balance during the downward movement of the bucket for indicating the character of the downward travel of the bucket.

ALFRED WILHELMI.